Aug. 19, 1947.  E. A. LARSSON  2,426,150
CUSHIONED TROLLEY POLE HEAD
Filed April 2, 1945
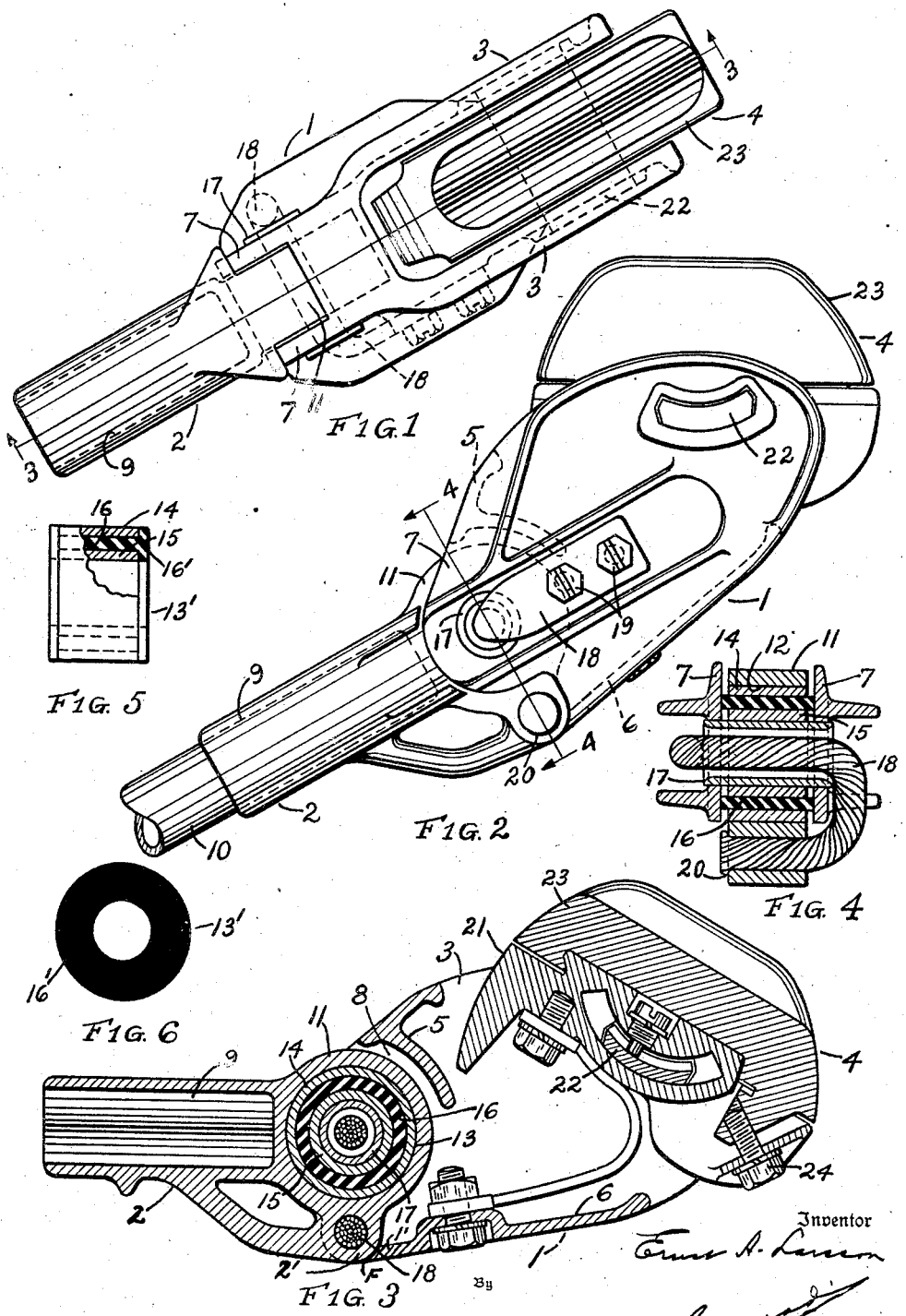
Inventor
Ernst A. Larsson
By
Attorney Patented Aug. 19, 1947

2,426,150

UNITED STATES PATENT OFFICE 2,426,150

CUSHIONED TROLLEY POLE HEAD

Ernst A. Larsson, Mansfield, Ohio, assignor to The Ohio Brass Company, Mansfield, Ohio, a corporation of New Jersey Application April 2, 1945, Serial No. 586,160

1 Claim. (Cl. 191—60.3)

My invention relates to current collector heads and trolley pole harps for use therewith.

Current collectors mounted on vehicles traveling at high speeds will produce vibrations which originate at the trolley wire. These vibrations and various noises are transmitted through the trolley heads, metal poles, trolley pole bases to the car body.

The car roof upon which the trolley base is mounted acts as a sounding board and thereby accentuates the noises and transposes the vibration into sound waves, all of which is very annoying and discomforting to the passengers.

Devices have been made to check the noises and vibrations before they reach the car roof and one such device is now on the market which substantially eliminates such noise effects but is quite expensive and the amount of vibration-absorbing material used is considerable and at the present time is quite restricted, as in this device rubber is employed.

My invention will prevent to a certain extent these vibrations and noises passing from the harp to the pole sufficiently for use on vehicles operating on car tracks as in the case of street cars, but not sufficiently in the case of the trolley coach operating on rubber tires, and I accomplish this result by making the harp in two parts and applying a resilient vibration and noise absorbing or deadening material where the two parts of the harp are mechanically connected.

One other important object of my invention, other than checking the flow of noise and vibration, is to permit a limited amount of relative movement of the parts of the harp in a vertical longitudinal plane. This limited vertical movement compensates for slight unevenness in the path of the current collector and reduces shock to the shoe which is of special advantage when carbon inserts are employed as the shoe moves along the trolley wire and tends to maintain the contact between the collector and the wire.

My invention resides in the new and useful construction, combination and relation of the parts hereinafter described and shown in the accompanying drawing and is a continuation in part of my Patent No. 2,385,582 dated September 25, 1945, filed December 13, 1943.

In the drawing:

Fig. 1 is a top view of my invention.

Fig. 2 is a side view of Fig. 1 and shows in combination therewith a trolley pole mounting.

Fig. 3 is a view in substantially full section of my invention taken on the line 3—3 of Fig. 1.

Fig. 4 is a partial transverse section taken on the line 4—4 of Fig. 2 using a modified form of vibration absorbing hinge.

Fig. 5 is a side view in partial section of a modified vibration controlling element employed between the parts of the harp.

Fig. 6 is an end view of Fig. 5.

In the preferred embodiment of my invention I provide a harp having an upper portion 1 and a lower portion 2.

The upper end of portion 1 has spaced side arms 3 between which is mounted, to oscillate, a current collector shoe 4 or a trolley wheel may be mounted therebetween in the manner shown in the prior art. The mounting of the collector shoe 4 shown is quite similar to that disclosed in my Patent 1,890,946 of December 13, 1932.

The side arms 3 of the portion 1 are held in fixed and spaced relation by the cross members 5 and 6 which are cast integral with the side arms.

The lower end of the upper portion 1 is formed with two short and spaced arms 7 forming a clevis 8.

The lower portion 2 is provided with a socket 9 at its lower end to receive a pole or other support 10 while the upper end of portion 2 is formed into a tongue-like member 11 which fits in the space 8 between the arms 7.

The tongue portion 11 has a through bore 12 to receive the vibration controlling element 13 shown in Figs. 3 and 4.

This element 13 comprises three essential parts, viz., an outer metal sleeve 14, an inner metal sleeve 15 and an interposed resilient or elastic member 16.

This member 16 is composed preferably of rubber of the required yielding properties and which is positioned between the adjacent surfaces of the sleeves 14 and 15 but not secured thereto, hence the parts 14, 15 and 16 may oscillate relative to each other. This provides a resilient joint element 13 in which the resilient portion 16 will be subject to compressive forces applied thereto as a result of the upward pressure of the trolley pole against harp and the shoe against the trolley wire as more fully explained later on.

The sleeve element 14 is provided with an outer diameter corresponding to the inner diameter of the bore 12 requiring the element 13 to be pressed into position thereby preventing relative movement of the sleeve member 14 and of the portion 2.

The clevis arms 7 at the lower end of the upper portion 1 are bored out to a diameter corresponding to the inner diameter of the sleeve 15 and which diameters correspond to the outer diameter of an auxiliary sleeve 17 which is a press fit with the aforesaid diameters thereby preventing any relative movement of the upper portion 1 and the sleeve 15.

The construction of element 13 and its attachment to the portions 1 and 2 are such that a relative movement of the upper and lower portions 1 and 2 is permitted about the axis of the sleeve 17 which may be termed an oscillatory movement.

The upper portion 1 of the harp has a projecting part 1' which is an extension of the part 6 and is so positioned as to engage the part 2' of the portion 2 at F (Fig. 3) while the shoe 4 is in engagement with the overhead construction since member 16 is not secured to both parts 14 and 15. This will limit the downward movement of the portion 1 about the axis of the sleeve 17 relative to the portion 2, but not its upward movement about the axis of the sleeve 17.

The contact F acts as a fulcrum or axis and since there is a downward force acting upon the portion 1 under operating conditions, the portions 1 and 2 will tend to move relative to each other about the axis or fulcrum F but which movement will be yieldingly resisted by the part 16 of the element 13.

However this movement places the resilient element 16 under compression and since the part 16 is a yieldable material, there will be a limited arcuate movement of the portion 1 relative to the portion 2 about the fulcrum F depending upon the characteristics of the part 16 and the downward force acting between the shoe 4 and the overhead construction in which case the axes of the sleeve 17 and bore 12 which normally coincide will separate but remain parallel.

This movement, although not great, is sufficient to tend to maintain contact between the overhead construction and the shoe 4 as it moves along the overhead and meets slight obstructions, and the shock to which the shoe is subjected is absorbed by the resilient material of the part 16.

This operation of my present invention is different from that disclosed in my Patent 2,385,582 in which the resilient member is secured to the inner and outer sleeve 14 and 15 and the sleeves secured to the portions 1 and 2. In my said patent the resilient member 16 is subject to a torsional force and all oscillation of the parts is the result of the resilient part of the pintle since there is no equivalent of fulcrum F.

In Fig. 4, the resilient element 16 projects beyond the ends of the sleeves 14 and 15, thereby filling the space between the clevis arms 7; in Fig. 5, the resilient element 16 projects beyond the ends of the sleeves 14 and 15 but covers the ends of the sleeves 14 and 15 as at 16' thereby preventing relative side shifting of the parts. In Fig. 1, the resilient element 16 does not project beyond the sleeves 14 and 15.

Thus the shocks to which the shoe 4' is subjected as it travels along the overhead trolley wire will be absorbed by the resilient member 16 at the same time permitting a relative movement of the portions 1 and 2 within the element 13 and 13'.

In the construction described and shown in Fig. 1, portions 1 and 2 are mechanically secured together but poorly connected electrically as at point F therefore I provide improved means to electrically connect portions 1 and 2.

I provide a cable or shunt 18 of flexible cable, preferably copper, which has one end flattened and attached to the side of the upper portion 1 by the screws 19. The cable is then carried through the unobstructed hollow of the sleeve 17 to the other side of the device, and there it is secured, as by soldering or brazing or other suitable means, to the lower portion 2 as at 20.

By this construction, the shunt 18 is located at the center of movement of the portions 1 and 2, that is on the neutral axis, where the relative movement is the least, therefore the bending of the shunt due to the said movements of the portions 1 and 2 is very slight, in fact practically nil.

The shoe 4 is not claimed specifically but comprises a holder 21 mounted on the arcuate bearing 22 for oscillation. The renewable wear portion 23 is secured in position by the bolt 24.

The material of the shock absorbing members 13 and 13' is preferably of rubber, such as car-spring rubber, but I find that some of the so-called synthetic or substitute products therefor may be used and also some of the so-called flexible plastics.

The resilient member 16, which bridges the space between the sleeves 14 and 15, may be secured to the attaching surface of one of the sleeves by a surface union which may be produced by various means well-known to those versed in the art of rubber manipulation and of synthetics and plastics and whereby the elastic or resilient member 16 will oscillate with that sleeve but relative to the other sleeve and sustain any radial or compressive forces acting thereon.

The amount of resilient material used in my improved construction is very much less than that used in certain prior art devices.

I use the word "pintle" as a convenient term for the resilient vibration and shock absorbing element 13 and 13' comprising the parts 14, 15 and 16, as it functions to hold the portions 1 and 2 against separation and permits limited relative oscillation of the portions much like a hinge pintle.

It is evident, that the portions 1 and 2 may still oscillate relative to each other about the axis of the sleeve 17 without resistance from the member 16 when the sleeves are secured to the portions providing the member 16 is not secured to both sleeves or is secured to only one sleeve, or if the member 16 is secured to both sleeves 14 and 15 then both sleeves or one sleeve should be free to rotate relative to the associated portion 1 and/or 2.

It will also be evident that one or both of the sleeves 14, 15 may be omitted and the resilient member 16 made to fill the remaining space; also the member 16 could be secured to the tongue portion and left free to oscillate relative to the other portion.

By omitting the members 14 and 15, the space for the shock member 16 is considerably greater and when unattached to the portions 1 and 2 considerable economy is effected in the cost of construction.

In the various modifications described above, due to the weight of portion 1 and its freedom of movement relative to portion 2, the said portions are in engagement at F at all times.

Further, if the parts 14, 15 and 16 should be secured together and the sleeves secured to the portions 1 and 2, then the members 1' and 2' will be so positioned as to engage when the collector is operating along an overhead trolley system and thereby form an axis or fulcrum about which the portions will oscillate, since the member 16 will yield under pressure as described above.

Having described my invention, what I claim as new and desire to secure by Letters Patent, is:

In a trolley head comprising a pair of parts, one part having means to attach it to a support and the other part provided with a current collector adapted to engage a trolley wire and one part having a clevis and the other part having a tongue to interfit with the clevis and each having a transverse opening aligned axially with the other opening to form a hinge joint and resilient non-metallic means interposed between the clevis and the tongue to hold the parts against separation and so related to the parts that the parts are free to oscillate relative to one another without restraint set up by torsional stress in the said resilient means, the combination with the said parts of cooperating means to limit the said oscillations in one direction only and to normally support one part relative to the other whereby positive pressure is assured between the current collector and the trolley wire and whereby the resilient means is subject to radial pressure only thereby cushioning the pressure of the collector against the trolley wire.

ERNST A. LARSSON.

REFERENCES CITED

The following references are of record in the file of this patent:

UNITED STATES PATENTS

| Number | Name | Date |
|---|---|---|
| 666,660 | Gabrio | Jan. 29, 1901 |
| 1,088,337 | Geiger | Feb. 24, 1914 |
| 2,304,595 | Prentice | Dec. 8, 1942 |
| 2,385,582 | Larsson | Sept. 25, 1945 |